April 15, 1930. W. R. FOX ET AL 1,754,621
TAPPING OR LIKE MACHINE
Filed April 3, 1925 7 Sheets-Sheet 1

Fig.1.

Inventor
William R. Fox
Howard D. Corwin
By Spear, Middleton, Donaldson & Hall
Attorney April 15, 1930. W. R. FOX ET AL 1,754,621
TAPPING OR LIKE MACHINE
Filed April 3, 1925 7 Sheets-Sheet 4

April 15, 1930. W. R. FOX ET AL 1,754,621
TAPPING OR LIKE MACHINE
Filed April 3, 1925   7 Sheets-Sheet 5

Patented Apr. 15, 1930

1,754,621

UNITED STATES PATENT OFFICE

WILLIAM R. FOX AND HOWARD D. CORWIN, OF JACKSON, MICHIGAN, ASSIGNORS TO FOX MACHINE COMPANY, OF JACKSON, MICHIGAN, A CORPORATION OF MICHIGAN

TAPPING OR LIKE MACHINE

Application filed April 3, 1925. Serial No. 20,458.

The invention is an improvement in the form of drilling and tapping machines disclosed in Letters Patent of the United States granted to us Aug. 18, 1925, No. 1,550,609, one object being to make the machine more rugged in certain particulars and more accurate and reliable in operation.

In the drawings:—

Fig. 2$^a$ is a detail view similar to a part of Fig. 2 of said patent showing the sliding saddle and the pinion and rack.

Fig. 3 is a side view of controlling mechanism.

Fig. 3$^a$ is a view similar to Fig. 3 of the said patent showing the rack bar and pinion engaging the same.

Fig. 4$^a$ is a view similar to Fig. 4 of the said patent i. e. a vertical section of the upper part of the machine showing the driving gearing.

Fig. 9$^a$ is a view similar to Fig. 11 of said patent, i. e. a vertical sectional view through the gear chest of the drilling and tapping head and with connections therefrom to the tapping clutch.

As in the machine of the patent above referred to, B is the main column, C is the head sliding vertically thereon and carrying the spindles of the tools, whether these be drills or tapping tools. This head carries a gear chest C' in which is located the gearing which drives the spindles of the tools. This gearing is driven from a vertical shaft O within a casing O', the shaft moving up and down with the head C. This shaft is driven from gearing in the casing D which in turn is driven from a pulley E through a main clutch interposed between the pulley E and said gearing.

There is also reversing clutch mechanism interposed between the gearing in casing D and the shaft O, this being enclosed in casing T', and all of this mechanism is substantially like that disclosed in the said patent, as is also the mechanism for giving the head C its movements, including the drilling feed box C$^3$ and the tapping feed box C$^4$ with the gearing contained therein. There is also a reversing rod $t$, which is connected to the head or gear chest C' for automatically reversing the movement of the head C when it reaches its prescribed low limit for accurately determining the depth of the tapping operation. The main clutch which is similar to that shown in said patent, is controlled by operating a shaft J mounted in the frame and having fixed thereto arms K and K'. All the above mentioned parts, excepting arm K', are shown in the patent above referred to and are marked with reference characters corresponding to those thus far used in this specification, with the exception of arm K'. The main clutch is shown in Fig. 4$^a$ at F. When the levers KK' are swung leftward the shaft J is turned to operate connections which throw the clutch out. The lever K is operated leftward against the tension of the spring 23 by a slide N mounted to work in a suitable guide-way or bracket, said slide being operated by a cam Q' on a lever Q which is fixed to a flange $i^2$ of a shaft $i$ mounted in the housing T'. This lever Q is operated as will be hereinafter described. The shaft J may be operated also through the arm K', for which purpose there is provided an arm 24 pivoted on a shaft 24$^a$ mounted in the frame and having a pawl 24$^b$ to engage a ratchet wheel 25 fixed to the said shaft. The said shaft 24$^a$ has mounted thereon, at diametrically opposite points, rollers 24$^c$. By pulling upon the hand cord 24$^d$ the arm 24 will be operated to make the pawl and ratchet turn the shaft 24$^a$, whereupon one of the rollers 24$^c$ will engage and swing the arm K' and thus operate the shaft J to throw out the main clutch. When the hand cord 24$^d$ is again operated, the pawl and ratchet will operate the shaft 24ª to remove the roll from the lever K' for the setting of the main clutch into operative position again. Each pull of the hand cord will move the shaft 24ª a quarter revolution so that it requires one pull to release the main clutch and the next pull to set it again, and so on. A spring 24ᵉ returns arm 24 to normal position. The connection for operating the main clutch from the shaft J is shown in Fig. 4ª, see the rod H.

Figure 3A:
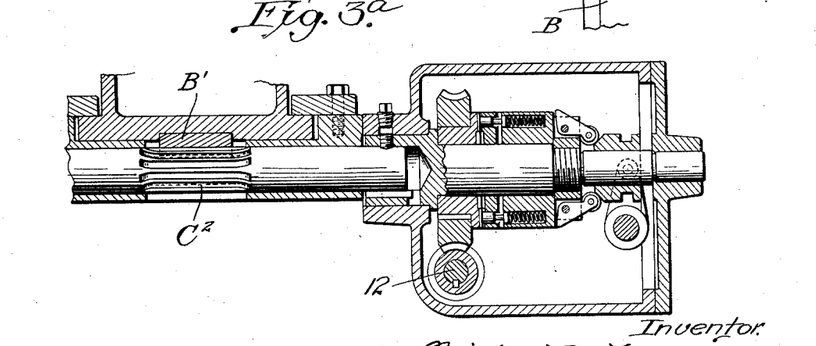

The lever Q which carries the cam point Q' for controlling the position of the slide N, and consequently the out and in positions of the main clutch is operated either into the position shown in full lines, Fig. 3, or into the position shown in dotted lines, or into a position intermediate of the two positions just mentioned. When in either the full line or the dotted line position of Fig. 3, the main clutch will be in engagement with the driving train to drive the machines, but when in the intermediate position of Fig. 4, the high point of the cam Q' will be in position to hold the main clutch out of engagement and the machine will be at rest. The cam Q' is slightly recessed at its high point to hold the clutch connection when operated.

The position of the lever Q in either the full line or the dotted line position, (in both of which the main clutch is in engagement) determines whether the taps are being driven forward (right hand) for tapping, or are being driven in the reverse direction for withdrawal from the tapped hole. When in the full line position the taps are driven forward for tapping, and when in dotted line position the taps are reversed in their direction of rotation for withdrawal from the tapped hole. The reversing clutch and gearing enters into this action and this mechanism is illustrated in Fig. 4ª involving the parts Oˣ, S, T and U, and the mechanism for operating the clutch is shown in Figs. 9 and 10 of said patent involving the shaft $i$, yoke $l$, lug $j$ and clutch shifting yoke $h$, bearing similar reference characters to those used herein, as will now be described.

The lever Q is operated by three different elements, i. e., by the hand lever 11; the hand lever 12, and by the rod $t$, as will be described. The lever Q is fixed by screws to a flange $i^2$ fixed on the shaft $i$ mounted in the casing T'. This shaft has splined or otherwise fixed thereto, a yoke $l$ which carries spring plungers $k'$, $k^2$, Fig. 7, carried by stems or bolts K³ slidable in the frame of the yoke and pressed by springs K⁴. The spring plungers bear on a lug $j$ of the clutch shifting yoke $h$, which like in the patent above referred to, is mounted loosely on the shaft $i$ and carries shoes $g'$ engaging grooves in the reversing clutch contained in the housing T', and causes the shaft O to be driven either forward or backward.

With the parts shown in the position of Fig. 3 which is for forward turning movement of the taps, the lever Q will be held locked in said position by a projection or locking catch 19ª on a locking lever 19 which is pivoted to the housing at 19ᶜ. The catch 19ª engages a catch lug 15ª on the lever Q in order to hold the lever Q in the position shown. The locking lever 19 is held in the locking position stated by the spring 23, and the locking lever 19 is withdrawn from its locking position of Fig. 3 to its unlocked position of Fig. 4 by a link 19ᵇ connected to the short arm 12ª of the lever 12. At its free end the lever Q has a block or plate $q$ pivoted by trunnions $q'$ therein, for which purpose the lever is forked to receive said trunnions. The automatic reversing rod $t$ passes loosely down through this block $q$ and as before stated, it is connected at its lower end with the head C. It carries two stops, 13 and 14, which are screw threaded onto the rod $t$. These stops carry plungers 13ᵇ, 14ᵇ to engage a groove 9ª in the rod $t$ by which the stops are prevented from rotating on the rod $t$. To adjust the stops along the rods the plungers are retracted and the stops are turned on the screw thread of the rod $t$ until the proper position is reached and then they are set by allowing their plungers to engage the groove in the rod.

The stop 13 has a heavy reversing spring 13ᶜ, and the stop 14 has a light reversing spring 14ᶜ.

Figure 1:
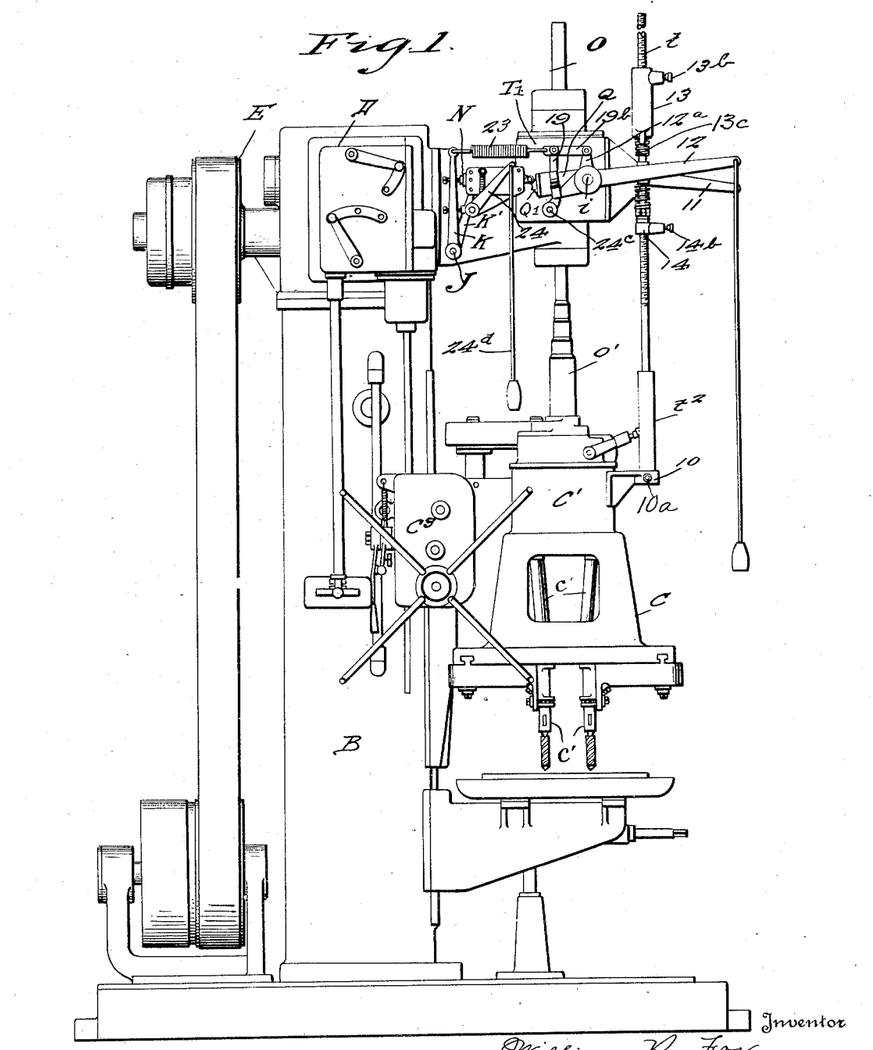
Figure 1 is a side elevation of the machine.
Figure 4:
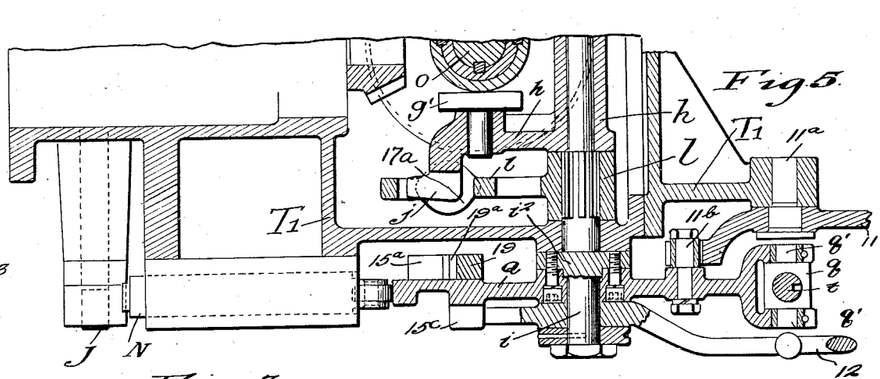
Fig. 4 is a similar view to Fig. 3, of the mechanism in a different position.
Figure 5:
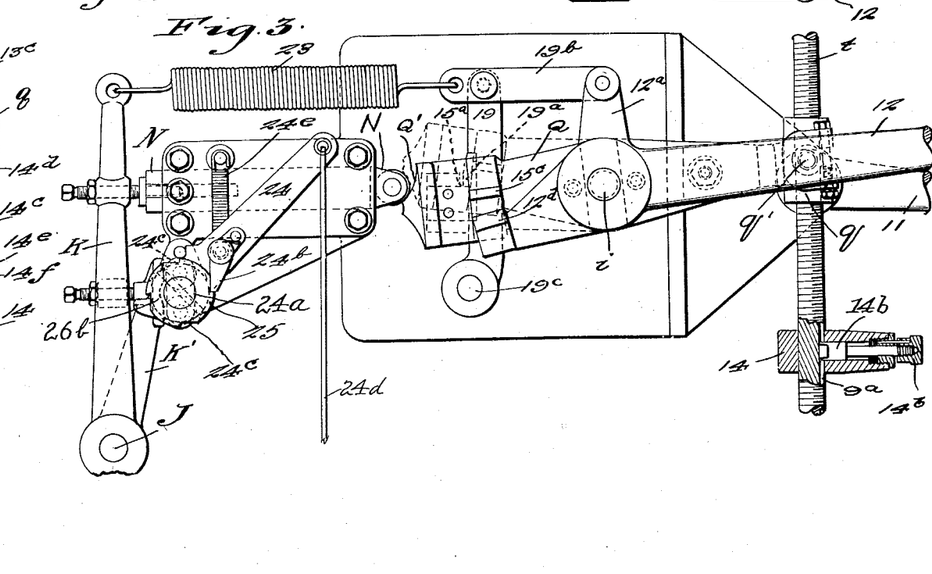
Fig. 5 is a plan view with parts in section, of the mechanism shown in Figs. 3 and 4.
Figure 6:
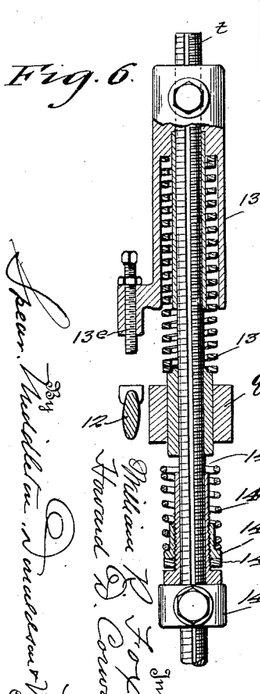
Fig. 6 is a detail front view of an automatic shifting rod and associated parts.

When the work is placed on the table and the taps such as shown at $c'$, Fig. 1, are secured to the spindle, we will assume that the control levers 11 and 12 are in the neutral position shown in Fig. 4. The cam Q' would then have its high point against the roller of the slide N which, therefore, would be pressed to its leftward position and the main clutch would be out of driving engagement with the driving connections. Furthermore, the tapping reversing clutch, which controls the direction of movement of the shaft O, and which is located in the housing T' as at Oˣ, $o''$, Fig. 4ª, would be in neutral position. To start the taps rotating in the right direction and the head C moving downwardly, the control lever 11 is pulled down, by means of the handle and cord attached thereto, and the cam Q' will now assume the position shown in Fig. 3, it being noted in this connection that the lever 11 is pivotally mounted at 11ª, and at its rear end is pivotally attached to the lever Q at 11ᵇ. This action, therefore, raises the right hand end of lever Q of which the shaft $i$ is the pivotal mounting, and consequently the left hand end of the lever Q is depressed. This allows the slide N to move rightward and the main clutch is thrown into operation to drive the machine and cause the head C with the taps to move downward. These actions are due to the spring 23 pulling lever K rightward, causing shaft J to turn clockwise and thus relieving pressure on rod H of Fig. 4ª, whereupon the clutch F will be set to drive the machine. At the same time the reversing clutch O<sup>x</sup>, o'', Fig. 4ª, will be thrown down by the yoke mechanism $l$, $h$, $g'$ and $j$ of Figs. 9 and 10 of the patent to drive shaft O in the proper direction, and as disclosed in Fig. 9ª, the rotation of this shaft through the master gear 4, spindle 3ª, gearing 6, 7, 10, 11, shaft 12 and worm gearing drives shaft $c^3$ shown in Fig. 3, has pinion $C^2$ meshing with rack B' Fig. 2ª for traversing the head up and down. At the same time the rocking of the shaft $i$ in anti-clockwise direction as a consequence of the movement of the lever Q as just described, will operate the clutch shifting yokes $l$ and $h$ to shift the tapping clutch to drive the shaft O in a forward direction for tapping.

Now when lever Q assumes the position shown in Fig. 3, it will be held locked by the catch 19ª of locking lever 19 setting itself into engagement over the catch piece 15ª of the lever Q, this action taking place because the spring 23 constantly pulls the locking lever leftward. The tapping operation proceeds until the lever 12 is operated automatically by the projection 13ᵉ on stop 13, which of course moves down with the rod $t$ because the latter is attached to head C and when this lever 12 is operated its arm 12ª draws the locking lever 19 to the right and withdraws the catch 19ª from the block or catch 15ª and then the power which has been stored in the spring 13ᵉ will exert its force on the block $q$ at the free end of lever Q, and said lever will be depressed at its right hand end and raised at its left hand end with the result that the lever will assume the position indicated in dotted lines in Fig. 3, the shaft $i$ will be rocked in clockwise direction, and the spring yoke $l$ will operate the clutch yoke $h$ to reverse the position of the clutch controlling the shaft O so that the direction of movement of the latter will be reversed to withdraw the taps as the head C rises.

In the reversing action just described, we will suppose that the stop 13 has been set on the rod $t$ at the proper height and that said stop is descending with the rod $t$ and head C during the tapping operation. The spring 13ᵉ will come in contact with the block or plate $q$ of the lever Q at a sufficient distance in advance of the reversing point to give sufficient pressure to the said spring to throw the cam lever Q into the reverse position as soon as said lever Q is released from locking catch 19ª by the screw 13ᵉ of the stop coming into contact with the lever 12, and it will be observed in this connection that no matter how hard the spring 13ᵉ may press down on the end of lever Q by pressing on its block $q$ said lever will be held from movement by the locking catch 19ª until the projection 13ᵉ contacts with the lever 12 and through its arm 12ª and link 19ᵇ causes the catch 19ª to be withdrawn from block or catch 15ª of lever Q. Then the power accumulated in the spring 13ᵉ will immediately effect the reversal of the lever Q and the direction of movement of the shaft O which drives the taps.

It will be observed also that the reversal of the taps will take place accurately as to depth of tapping regardless of the degree of power the clutches are delivering to the vertical shaft O, and the reversal will take place as accurately when running idle as will be the case when all the spindles are carrying taps and the machine is doing full duty. This is important because in tapping what is termed bottom holes, it is absolutely necessary that the reversing take place at the same point in the downward movement of the head.

On the front face of the reversing lever 12 there is a projection 12ᵈ to contact with a similar projection 15ᶜ on the main reversing and cam carrying lever Q. This makes it possible to reverse the movement at any time by drawing down on the handle and cord attached to the free end of lever 12, because this downward movement of the lever 12 at its free end will withdraw locking lever 19 and then projection 12ᵈ will come against projection 15ᶜ and reverse the position of lever Q from full line to dotted line position. In order to effect accurate automatic reversal by the stud 13ᵉ which is in the form of a screw, the two lugs 12ᵈ and 15ᶜ will be set such a distance apart that the locking lever will be operated to withdraw its catch 19ª from 15ª just before 12ᵈ strikes 15ᶜ.

When the reversal takes place, the head C runs upwardly the same as in the patent above mentioned, but with the adjustable stop 14 and its spring 14ᶜ, the cam Q' can be made to stop in the neutral position shown in Fig. 4, or it can be made to throw below the center as in Fig. 3, this reversing the machine automatically. These actions can be secured by properly adjusting the stop 14 and its spring 14ᶜ along the rod $t$ in relation to the end of lever Q. Stop 14 has an upward extension 14ᵈ the lower part of which is screw threaded and receives a nut 14ᵉ having a shoulder on which the spring 14ᶜ rests. A lock nut is provided at 14ᶠ.

The spring 14ᶜ is set sufficiently in advance of the projection 14ᵈ to be slightly compressed when the projection 14ᵈ contacts with the block $q$ at the free end of the main reversing and cam carrying lever Q. The upward movement of the head and the compression of spring 14ᵉ forces the cam lever Q to neutral position. If it is desired that the machine reverse automatically and not stop in neutral position, then the spring 14ᶜ is elevated further by the adjustment of the contact 14, which will give sufficient movement to the lever Q to throw its cam Q' below the center line of slide N, and therefore the machine will change direction automatically to move the head down again and drive the taps forwardly for tapping, but as it is usually desired to have the machine at rest when it reaches the end of its upstroke, the adjustment of contact 14 with its spring is made to accomplish this.

At any time during downward movement of the head C reversal may be effected by operating the lever 11 by hand.

If, for any reason, it is desired to stop the machine, the cord 24$^d$ is pulled, which will operate lever 24 to stop the machine immediately by throwing the main clutch out of engagement.

The rod $t$ extends loosely through the tube $t^2$ and is fastened in bracket 10 by a pin 10$^a$ holding said rod firmly when tapping is being done. When the machine is used for drilling the rod $t$ is detached from the head C by withdrawing the pin which leaves the head free from the rod. The pipe or tube $t^2$ prevents the rod $t$ from entirely coming out of connection with the head. When detached, the rod will pass down through the tube without meeting any obstruction. This allows the head to be moved from above or below the position used in tapping. It will be again coupled up when the tapping operation is again taken up.

Figure 8:
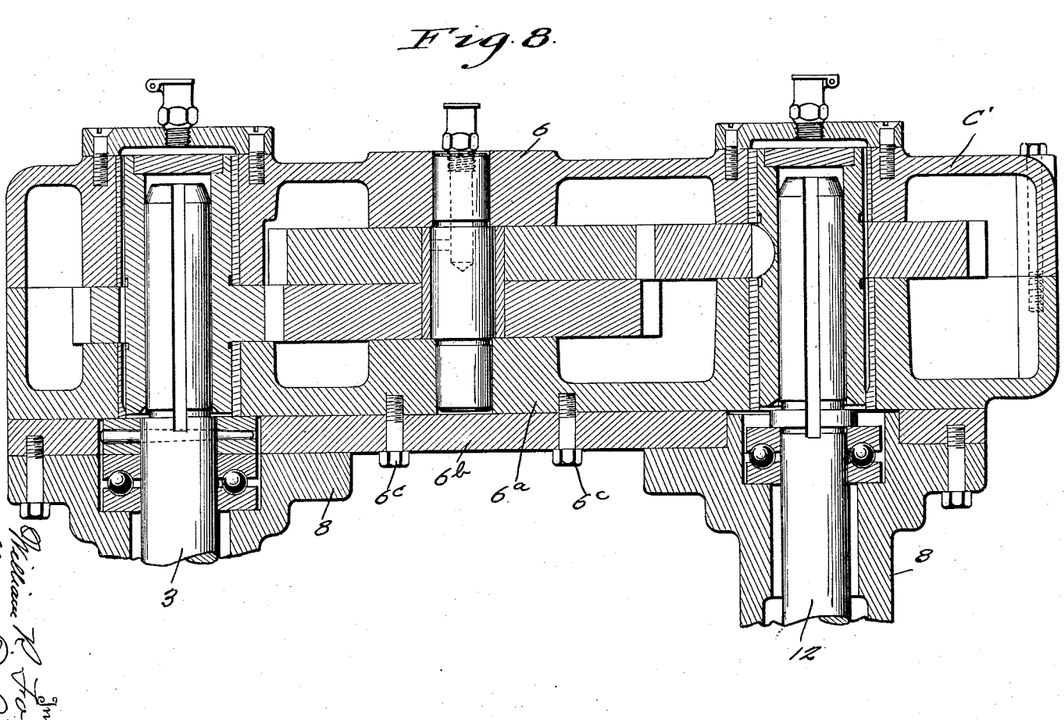
Fig. 8 is a sectional view of a gear chest with its gearing.
Figure 9A:
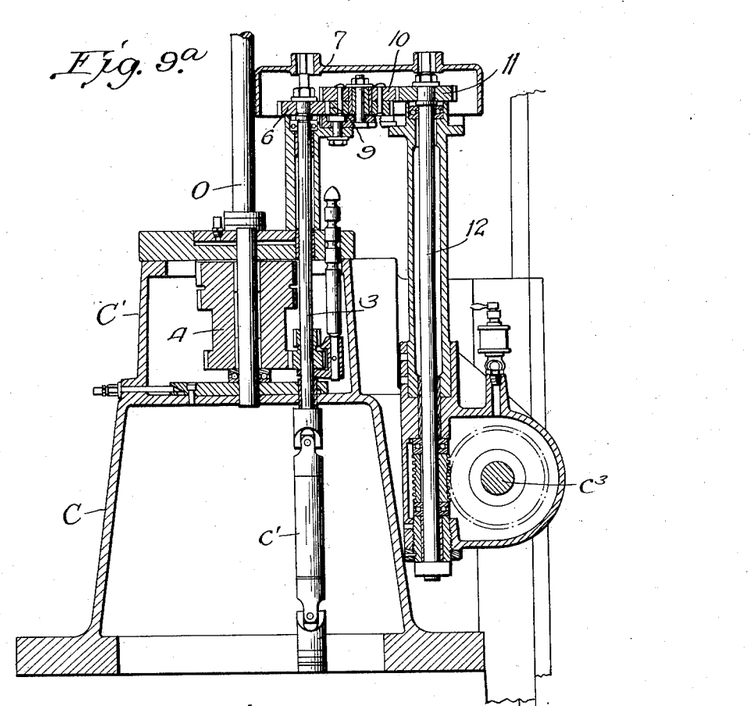

Referring to Fig. 8, this shows a gear box which is a unit. The extension of one of the spindles is shown at 3, which comes up through the head, and drives, through gearing, the shaft 12 corresponding to a shaft 12 of said patent. The gear box is in two pieces, 6 and 6$^a$, the bottom or body part 6$^a$ being secured to the plate 6$^b$ by the bolts 6$^c$. Plate 6$^b$ is in turn secured to uprights 8. The two parts of the gear case are secured together by suitable bolts. The body part carries the studs and lower bearing. The cover carries the upper bearing. When it is desired to change gears, the whole gear case is removed and a new case is put in position carrying its own gears.

Figures 2, 7, 9:
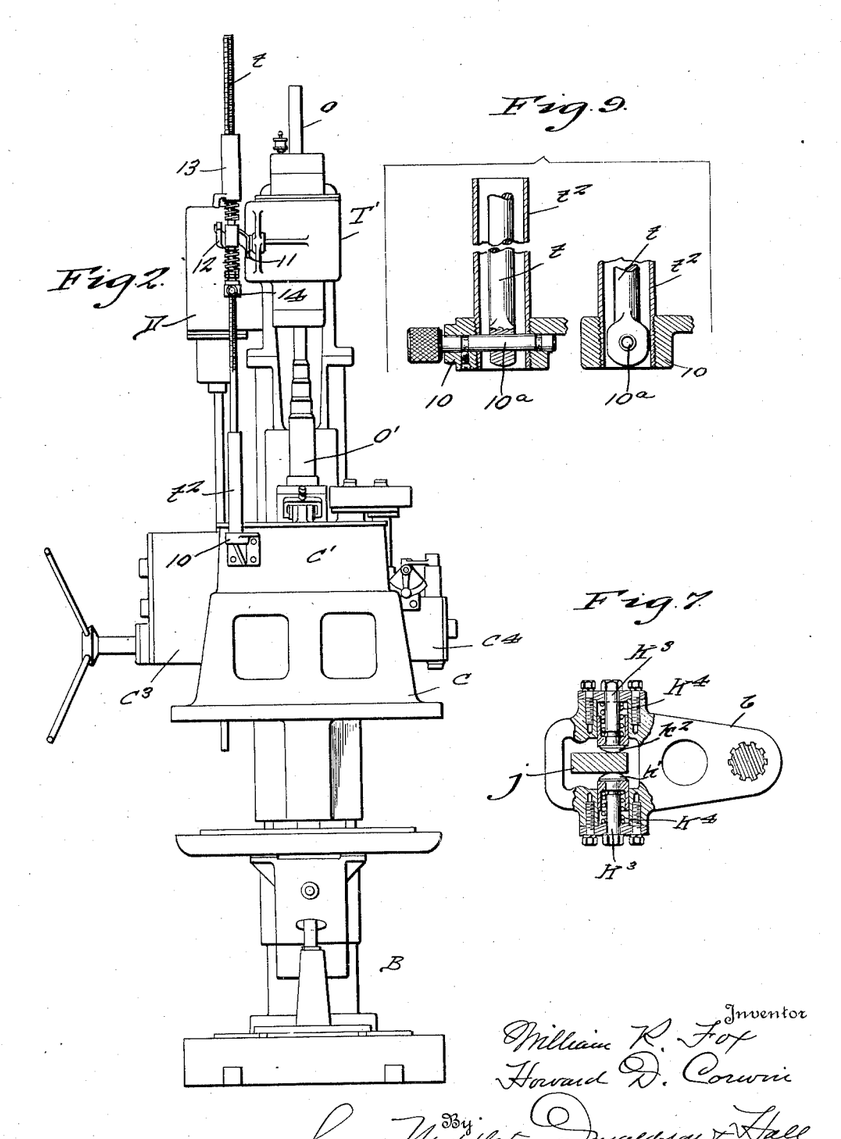
Fig. 2 is a front view.
Fig. 7 is a view of detail mechanism, partly in section.
Fig. 9 shows details.
Figures 2A, 4A:
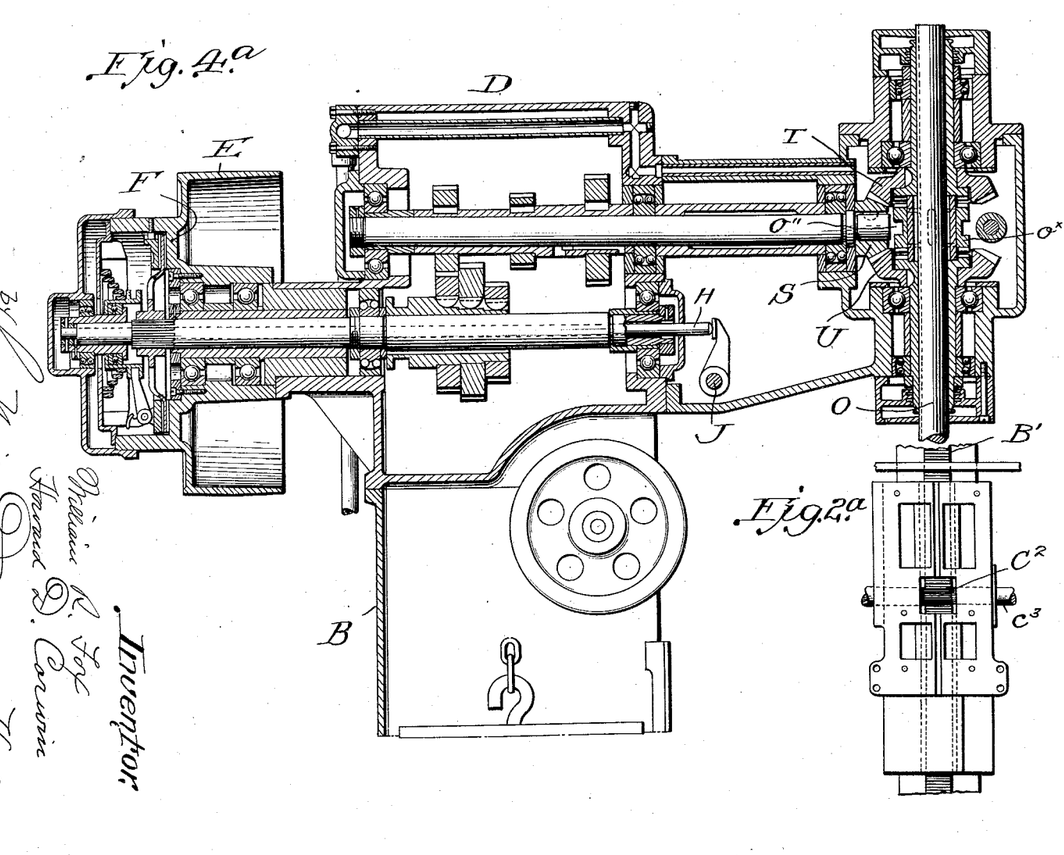

It will be noted from Fig. 9 that the pin 10$^a$ is provided with a portion (at the left) accessible to the hand of the operator serving as a finger piece or handle by which the pin quickly can be operated, requiring no tool of any kind in making the connection between the rod $t$ and the head $c$ or in disconnecting said parts.

We claim:—

1. In combination in a machine of the character described, a travelling head, a tool carried thereby, driving means for the head including a reversing clutch, means for reversing said clutch including a rod having a contact thereon, said rod having a slip joint connection with the head and means for detachably locking the rod at said connection to move with the head said slip joint guiding the rod when detached, substantially as described.

2. In combination in a tapping machine, a travelling head carrying a tap, a clutch for reversing the direction of movement of the head, a lever for shifting the clutch, a lock for the lever, and a hand operated lever for releasing the lock, said hand operated lever having movement additional to that necessary to release the lock for applying power to and for operating the clutch shifting lever, substantially as described.

3. In combination in a tapping machine, a travelling head carrying a tap, a clutch for reversing the direction of movement of the head, a lever for shifting the clutch, a lock for the lever, and a hand operated lever for releasing the lock and for operating the clutch shifting lever, a spring moving with the head for placing the clutch shifting lever under tension, and contact means moving with the head for operating the hand lever automatically to release the lock, whereupon said spring will operate the clutch shifting lever, substantially as described.

4. In combination in a tapping machine, a travelling head carrying a tap, a clutch for reversing the direction of movement of the head, a lever for shifting the clutch, a lock for the lever, and a hand operated lever for releasing the lock and for operating the clutch shifting lever, a spring moving with the head for placing the clutch shifting lever under tension, contact means moving with the head for operating the hand lever automatically to release the lock, whereupon said spring will operate the clutch shifting lever, a rod connected with the head and carrying said spring and contact, substantially as described.

5. In combination in a tapping machine, a travelling head carrying a tap, a clutch for reversing the direction of movement of the head, a lever for operating the clutch, two hand operated levers, one for operating the clutch lever in one direction, and the other for operating the clutch lever in the other direction, a lock for said lever operated from one of the hand levers, and means for operating said last mentioned hand lever automatically, said means moving with the head to effect said automatic action at a prescribed point in the movement of the head, substantially as described.

6. In combination in a machine of the class described, a lever for controlling the main clutch of the machine, a reversing clutch, means for operating said lever to throw out the main clutch when the reversing clutch is shifted, and means for operating said lever by hand, including a shaft having a ratchet and contacts mounted thereon, and a lever and pawl for moving the ratchet step by step to cause the said contacts to operate for moving the said lever, substantially as described.

7. In combination in a tapping machine, a travelling head carrying a tool, reversing gearing for changing the direction of movement of the head, a main clutch for driving the machine and imparting its power through the reversing gear, a lever for shifting the reversing gear and for throwing the main clutch out of operation, said lever having a cam with a detent portion in its surface to hold the connections leading to the main clutch in neutral position, substantially as described.

8. In combination in a tapping machine, a travelling head carrying a tool, reversing gearing for changing the direction of movement of the head, a main clutch for driving the machine, and means in which power is stored by the movement of the head, and controlling means whereby at a prescribed point in the movement of the head, the power stored in said means is applied to throw out the main clutch and reverse the gearing to change the direction of the head, substantially as described.

9. In combination in a tapping machine, a travelling head carrying a tool, reversing gearing for changing the direction of movement of the head, a main clutch for driving the machine, and means in which power is stored by the movement of the head, connections for operating the main clutch, connections for operating the reversing gearing, means for applying the stored power to the main clutch connections for operating them to throw out the main clutch and thereafter relieve the clutch from the influence of said stored power, said means also applying the stored power to the connections which operate the reversing gearing, and means for resetting the main clutch when the reverse position of the gearing has been effected.

10. In combination in a tapping machine, a travelling head carrying a tool, reversing gearing for changing the direction of movement of the head, a main clutch for driving the machine, means in which power is stored by the movement of the head, and controlling means whereby at a prescribed point in the movement of the head, the power stored in said means is applied to throw out the main clutch and reverse the gearing to change the direction of the head, said controlling means including a lock for the reversing gearing to hold it against reversal while the power is being stored, and a contact moving with the head and releasing said lock at said prescribed point, substantially as described.

11. In combination in a tapping machine, a travelling head carrying a tool, reversing gearing for changing the direction of movement of the head, a main clutch for driving the reversing gear, a lever with connections operated thereby for releasing the main clutch and reversing said gearing, a lock for said lever, a spring in which power is stored as the head travels downward, and a contact travelling with the head to release the said lock, whereby the spring will exert its force to operate said lever and said connections for releasing the main clutch and for shifting the reversing gearing for the return movement of the head, substantially as described.

12. In combination in a tapping machine, a travelling head carrying tool, reversing gearing for changing the direction of movement of the head, a main clutch for driving the reversing gearing, an adjustable spring contact travelling with the head and connections operated thereby including a member to be positioned to throw out the clutch or to pass said position to a position to change the reversing gearing to effect either the stoppage of the machine on the upstroke of the head, or to reverse the direction of movement of said head, according to the adjustment of said control substantially as described.

13. In combination, a travelling head carrying a tapping tool, reversing gearing for changing the direction of travel of said head, a main driving clutch, a lever for operating said clutch, a cam lever for operating said clutch operating lever, means for operating the reversing gearing from said cam lever, a lock for holding said cam lever in operative position, whereby the main clutch will drive the head through said reversing gearing, a spring between said clutch operating lever and the lock for stressing both, a contact travelling with the head for releasing the lock against the power of said spring, and means for operating the cam lever when released from the lock for setting said clutch operating lever in position to release the clutch, and for operating the reversing gearing for changing the direction of motion of the head.

14. In combination with a movable head, means for moving the head up and down, including reversing mechanism, a rod having means for operating the reversing mechanism, a sleeve on the head through which the rod can work loosely when detached therefrom, and means detachable for fixing the rod to the sleeve, substantially as described.

15. In combination in a tapping machine, a head carrying the tool, reversing driving mechanism for the head, a main clutch for driving said mechanism, means for operating the said clutch comprising a cam having a high point, a movable member operated thereby for operating the main clutch, said cam having a recess at its high point for receiving the connection and maintaining controlling contact of the cam therewith when said cam is in position to hold the clutch released.

16. In combination, motion reversing means, a member moved thereby in one direction or the other, a shaft connected to said reversing means, a rod connected to said movable member to move therewith, a lever connected with the shaft and adjustable stops on the rod to contact with said lever to turn the shaft for setting the reversing means to drive in either one direction or the other or for setting the reversing means in neutral position, a main clutch controlling the operation of the reversing means and means operated by said lever for throwing the main clutch out of operation when the reversing is done or when neutral position of said reversing means is assumed.

17. In combination, motion reversing means, a member moved thereby in one direction or the other, a shaft connected to said reversing means, a rod connected to said movable member to move therewith, a lever connected with the shaft and adjustable stops on the rod to contact with said lever to turn the shaft for setting the reversing means to drive in either one direction or the other or for setting the reversing means in neutral position, locking means for holding the lever, a spring on the rod for applying pressure to said lever, and means on the rod for releasing said lock after the spring has been compressed.

In testimony whereof, we affix our signatures.

WILLIAM R. FOX.
HOWARD D. CORWIN.